(12) United States Patent
Woerner

(10) Patent No.: US 6,267,889 B1
(45) Date of Patent: Jul. 31, 2001

(54) ROTARY DRUM FILTER

(75) Inventor: Douglas L. Woerner, Knoxville, TN (US)

(73) Assignee: MDF, LLC, Knoxville, TN (US)

( * ) Notice: Subject to any disclaimer, the term of this patent is extended or adjusted under 35 U.S.C. 154(b) by 0 days.

(21) Appl. No.: 09/491,256

(22) Filed: Jan. 26, 2000

(51) Int. Cl.$^7$ .................................................. B01D 63/16
(52) U.S. Cl. ............... 210/636; 210/321.69; 210/321.87; 210/402; 210/650; 210/770; 210/784
(58) Field of Search ......................... 210/321.69, 321.87, 210/391, 396, 398, 399, 402, 406, 407, 497.01, 650, 767, 768, 770, 780, 784, 791, 490, 636

(56) References Cited

U.S. PATENT DOCUMENTS

| | | |
|---|---|---|
| 3,669,879 | 6/1972 | Berriman . |
| 3,974,068 | 8/1976 | Ebner et al. . |
| 4,025,437 | 5/1977 | Ball et al. . |
| 4,040,965 | 8/1977 | Kohlheb . |
| 4,702,845 * | 10/1987 | Wykoff ................................. 210/402 |
| 4,836,917 * | 6/1989 | Tomita et al. ........................ 210/402 |
| 5,000,848 | 3/1991 | Hodgins et al. . |
| 5,160,773 | 11/1992 | Sassa . |
| 5,227,349 | 7/1993 | Matthews et al. . |
| 5,259,952 | 11/1993 | Lee . |
| 5,421,997 | 6/1995 | Gerteis . |
| 5,470,472 | 11/1995 | Baird et al. . |

FOREIGN PATENT DOCUMENTS

| | | |
|---|---|---|
| 420 563 | 3/1924 | (DE) . |
| 0 126 655 | 11/1984 | (EP) . |
| 0 462 369 B1 | 8/1994 | (EP) . |
| 271 4300 | 6/1995 | (FR) . |
| 1 280 602 | 7/1972 | (GB) . |
| 94/14519 | 7/1994 | (WO) . |

OTHER PUBLICATIONS

JP 08 309 160 "Structure of Filter Plate of Rotary Membrane Separator" Published Nov. 26, 1996 (Abstract only).
JP 08 243 363 "Rotary Membrance Separation Filter Capable of Maintaining High Filtration Rate" Published Sep. 24, 1996 (Abstract only).
JP 10 033 951 "Membrane Filter Equipped with Cake Thickness Control Mechanism" Published Feb. 10, 1998 (Abstract only).

* cited by examiner

Primary Examiner—Joseph W. Drodge
(74) Attorney, Agent, or Firm—Luedeka, Neeley & Graham, P.C.

(57) ABSTRACT

The invention relates to a filter assembly for producing a paste-like filter cake and a substantially solids free filtrate or permeate. The filter assembly includes a substantially cylindrical member having an exterior foraminous surface, the cylindrical member being mounted on an elongate shaft for rotating the surface about an axis defined by the shaft. The exterior foraminous surface is covered by a microporous filter media. A stationary housing is positioned adjacent a portion of the exterior surface of the cylindrical member. The stationary housing includes a filter feed inlet and a sealing device and is spaced from the exterior surface a distance sufficient to enable cross flow relative to the filter media. Unique filter seal members promote retention of fluid to be filtered in a filtration area defined by the housing and cylindrical member. As the cylindrical member is rotated about the axis, a cake removal or membrane cleaning device removes filter cake from the filter media. The unique filter seal members enable use of a rotating cylindrical member containing the filter media. The unique design of the filtration device provides high solids production similar to a drum or belt filter without the use of filter aids and provides fine particle removal from a liquid similar to a membrane filter, however with substantially higher solids content than with a conventional membrane filter.

28 Claims, 11 Drawing Sheets

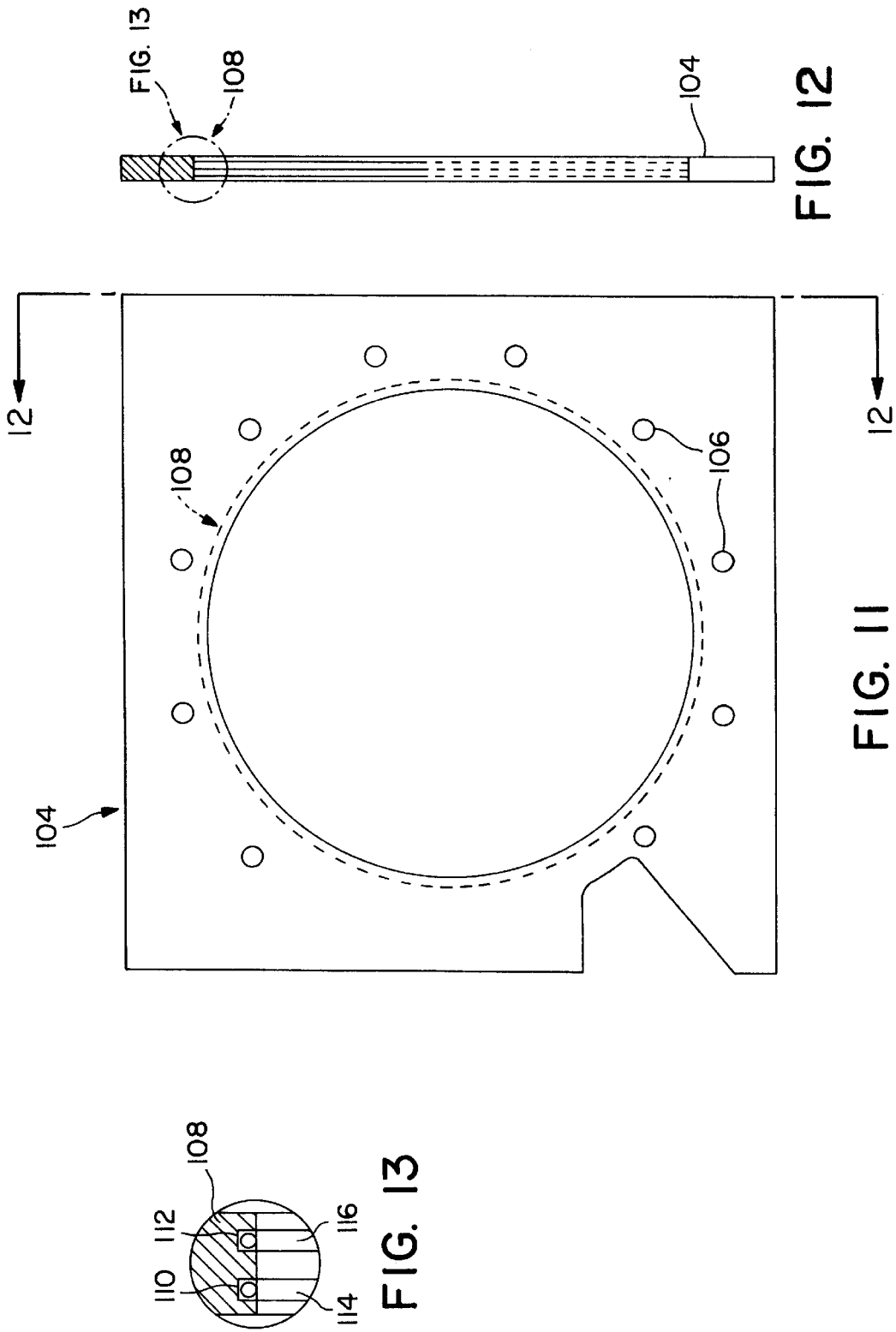

ROTARY DRUM FILTER

FIELD OF THE INVENTION

The invention relates to a drum filter which uses a membrane or very fine filtration media and an improved filtering method for producing a substantially solids free filtrate and/or a paste-like filter cake without the use of filter aids.

BACKGROUND

Environmental concerns and economics encourage the collection and reuse of many materials which once were thought to be of little or no value. In some industries a large volume of liquids or solvents are used for producing valuable products. These ho liquids and solvents often times become contaminated with fines or particulates which pose environmental hazards or which may have significant value if they could be recovered from the liquids in an economical manner. Recovery of fine or very fine particles having an average diameter of less than about 20 microns represents one such need. In some industries, production of a high solids filter cake containing valuable product is desirable. It is also desirable to recover such filter cake products without the use of filter aids which have to be removed from the filter cake product in a subsequent step. In other industries, the solids are collected and disposed of and a substantially solids free filtrate or permeate is collected and reused. Whether it is the liquid portion or the solid portion which is desired to be recovered, there continues to be a need for a means for recovering difficult to recover solids and for producing substantially solids free liquids from large volumes of liquid streams in a cost efficient manner.

SUMMARY OF THE INVENTION

With regard to the above, the invention provides a filter assembly for treating a mixture of solids and liquid to yield a paste-like filter cake and/or a substantially suspended solids free filtrate or permeate. The filter assembly includes a substantially cylindrical member having an exterior foraminous surface, the cylindrical member being mounted on an elongate shaft for rotating the exterior foraminous surface about an axis defined by the shaft. The exterior foraminous surface is preferably covered by a microporous filter media, such as a membrane filter or very fine woven filter cloth. A stationary housing is positioned adjacent at least a portion of the exterior surface of the cylindrical member. The stationary housing includes a filter feed inlet and a sealing device. The housing is spaced from the exterior surface of the cylindrical member a distance sufficient to enable cross flow relative to the cylindrical surface. Unique filter seal members operatively associated with the housing and cylindrical member define a filtration area and promote retention of fluid to be filtered under pressure in the filtration area adjacent the filter media. As the cylindrical member is rotated about the axis, a cake removal and/or membrane cleaning device removes filter cake from the filter media.

In another aspect, the invention provides method for producing a paste-like filter cake from a mixture of liquid and solids using a filter system which includes a substantially cylindrical member having an exterior foraminous surface. The cylindrical member is mounted on an elongate shaft for rotating the exterior foraminous surface about an axis defined by the shaft. A microporous filter media such as a membrane filter or very fine woven filter cloth preferably covers the exterior foraminous surface. At least one stationary housing is positioned adjacent at least a portion of the exterior surface of the cylindrical member, each of the stationary housings including a filter feed inlet and a sealing device. The housing is spaced from the exterior surface of the cylindrical member a distance sufficient to enable cross flow and/or flooding of the space between the housing and cylindrical member. The filtration system also includes one or more filter seal members which are operatively associated with the housing and cylindrical member and define a filtration area between the housing and cylindrical member for promoting retention of fluid to be filtered in the filtration area. A drive is provided for rotating the cylindrical member about the axis and a cake removal and/or membrane cleaning device external to the one or more housings is provided adjacent the exterior surface of the cylindrical member for removing filter cake therefrom as the cylindrical member rotates. A liquid containing solids is fed through the filter feed inlet at a pressure and a rate sufficient to form a filter cake having a solids content including bound water above about 65 percent by weight on the filter media while rotating the cylindrical member relative to the housing. A relatively even filter cake height is maintained during filtering, and the filter cake is dried and removed from the filter media external to the housing. The filter media may also be cleaned for reuse.

The filtration device of the invention provides significant operational and cost advantages over conventional membrane filtration devices and over conventional belt or drum filters. Pressurized, cross-flow and/or puddle filtration can be conducted with the filter system according to the invention to provide substantially continuous removal of unbound water from solids and substantially continuous cleaning of the filter media. The unbound water removal is substantially greater than obtainable by use of conventional membrane filters or ultrafiltration processes.

Use of unique filter seal members enables use of a rotating cylindrical member containing a microporous filter media which is not abraded or otherwise significantly damaged by the seal member. According to the invention, the filtration surface moves relative to a housing member so as to enter and exit the housing member thereby providing a filtration zone between the housing and filtration surface which may be pressurized. As the filtration surface moves relative to the housing member, the surface undergoes periodic filtration and product removal. The unique design of the filtration device provides high solids production similar to a drum or belt filter without the use of filter aids and provides fine particle removal from a liquid similar to a membrane filter, however with a higher solids content than conventional membrane filters.

For the purposes of this invention, the term "solids" means suspended particulates and dissolved polymers and excludes dissolved salts. The term "bound water" means water which is trapped within the pores or interstices of the solids and which cannot be easily removed from the solids by mechanical techniques. The term "microporous" means having an average pore size ranging from about 0.01 to about 10 microns in diameter.

BRIEF DESCRIPTION OF THE DRAWINGS

Further features and advantages of the invention will become apparent by reference to the detailed description when considered in conjunction with the figures, which are not to scale, wherein like reference numbers indicate like elements through the several views, and wherein:

FIG. 11 is a side elevational view of a seal plate which is attached to a stationary housing according to the invention;

FIG. 12 is an elevational inside view of a seal plate according to the invention taken along View E—E of FIG. 11;

FIG. 13 is an enlarged view of a portion of a seal plate according to the invention;

DETAILED DESCRIPTION OF THE PREFERRED EMBODIMENTS

Figure 1:
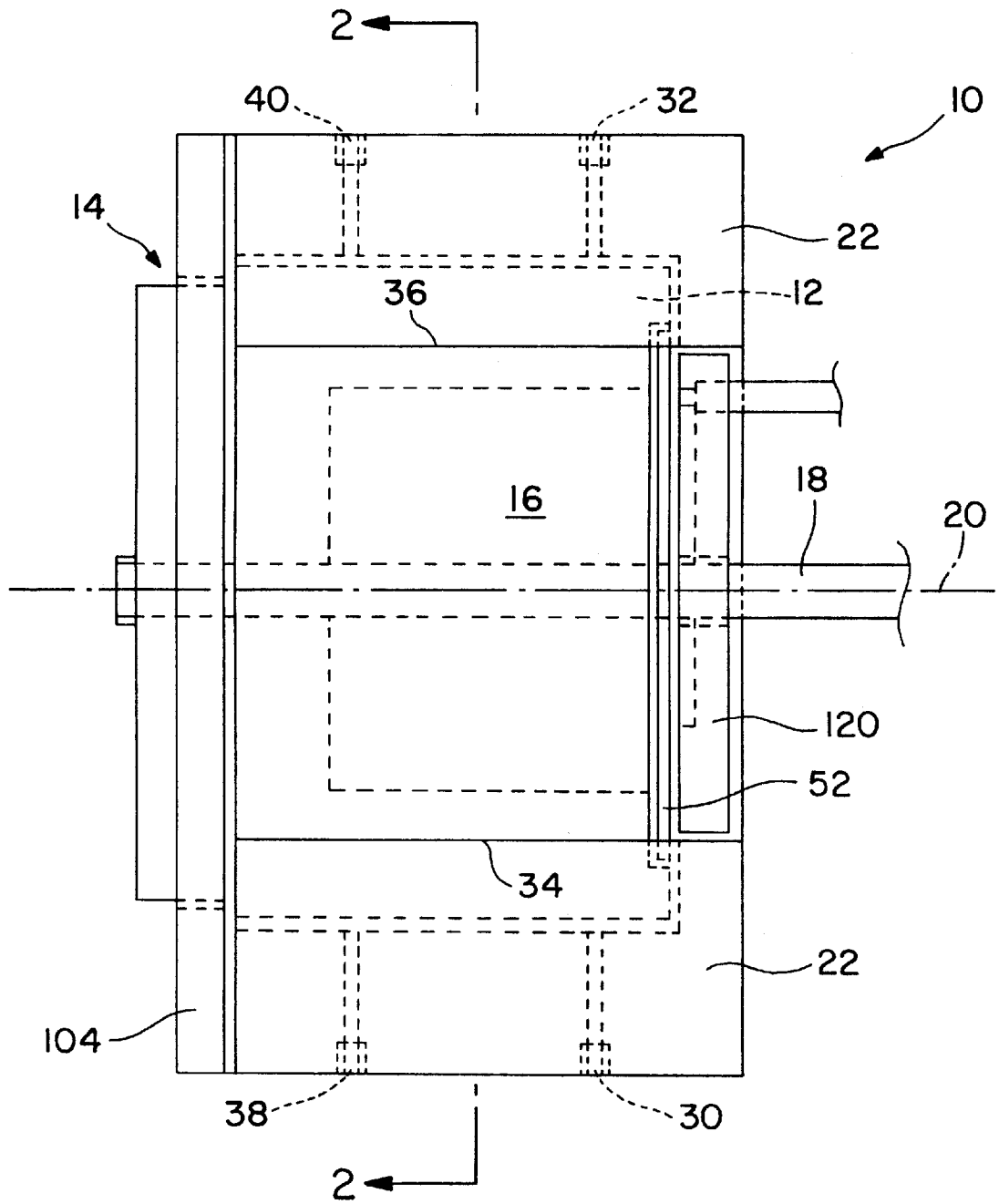
FIG. 1 is a front end elevational view of a filter system according to the invention.
Figure 2:
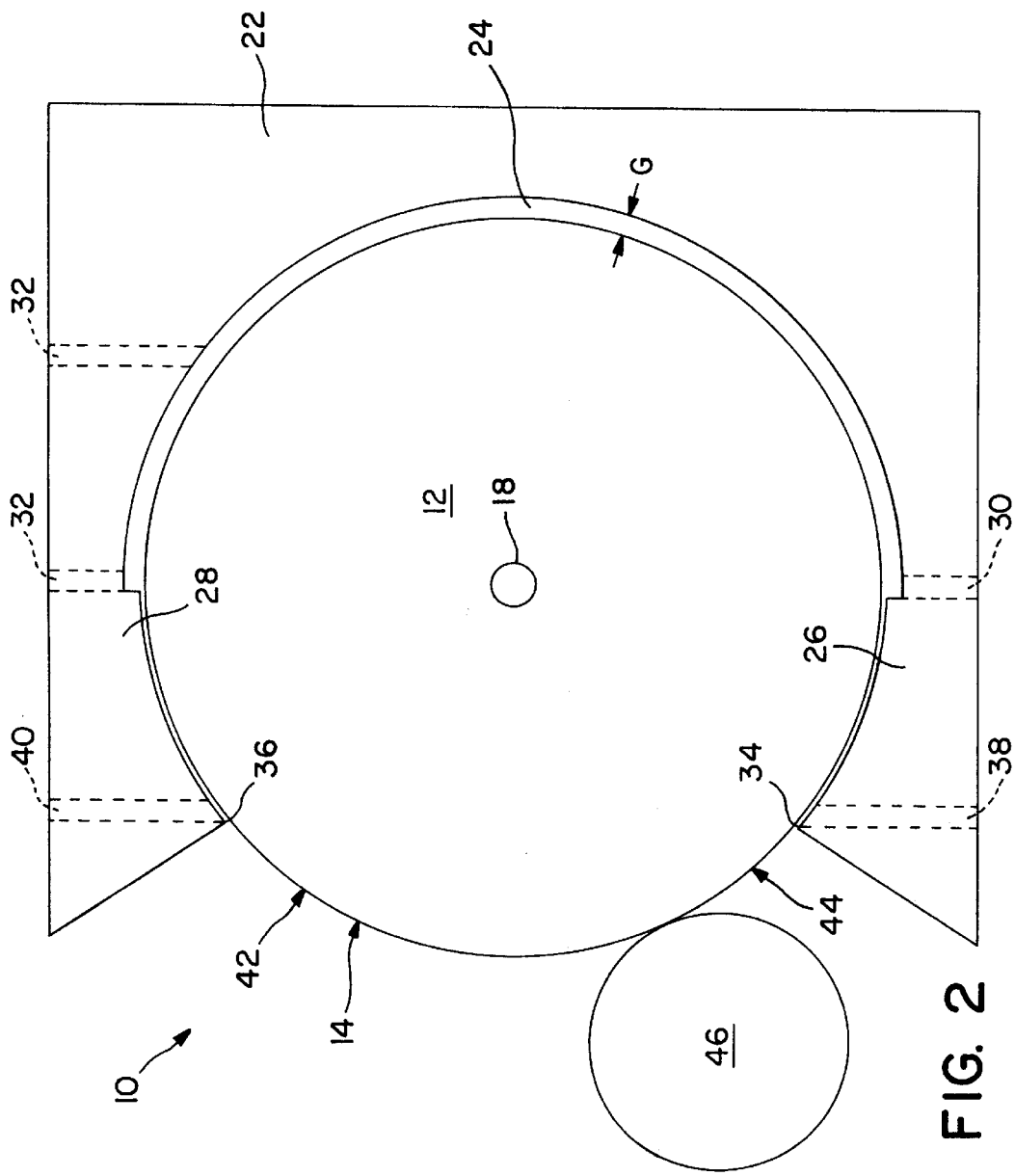
FIG. 2 is cross-sectional side view of a filter system according to the invention taken along View A—A of FIG. 1.

With reference now to the drawings, various features of the invention will now be described. FIG. 1 is an elevational front end view of a filter system assembly 10 according to the invention and FIG. 2 is a cross sectional view of the filter system 10 of FIG. 1 taken along view A—A. The assembly 10 includes a cylindrical member 12 having an exterior foraminous surface 14 and an internal cavity 16 opposite its exterior surface 14 thereof. The cylindrical member 12 is mounted on a shaft 18 for rotation about an axis 20 defined by the shaft 18. As described in more detail below, at least a portion of the exterior surface 14 of the cylindrical member 12 is preferably covered with a microporous filter media for the purpose of separating solids and liquids from one another.

The filter assembly 10 also includes at least one stationary housing 22 for maintaining a liquid to be filtered adjacent the filter media. The housing 22 is located adjacent at least a portion of the exterior surface 14 of the cylindrical member 12 as shown more clearly in FIG. 2. The portion of the exterior surface 14 adjacent the housing 22 defines a filtration area 24 between inlet seal 26 and exit seal 28 for the filter system 10. Multiple stationary housings 22 defining multiple filtration areas 24 may be used particularly for liquid having a relatively high solids content such as when the solids in the liquid fed to the filter is about ⅓ or greater by volume than the final solids level in the filter cake. The filtration area 24 preferably has a gap G between the housing 22 and exterior surface 14 ranging from about 60 to about 500 mils or more.

The housing 22 includes one or more filter feed inlets 30 and preferably one or more outlets 32 for crossflow of fluid relative to the filter media in the filtration area 24. In order to reduce the flow of fluid past edges 34 and 36 of the housing 22 seals 26 and 28 are provided. It is preferred to include seal suction ports 38 and 40 for applying a subatmospheric pressure to the filter seals 26 and 28 to remove any liquids which may accumulate in the seals 26 and 28. For puddle coating of the filter media, liquid is removed from the filter cake by flow through the filter media into the internal cavity 16. Thus there is no need for outlet 32 in housing 22.

The portion of the cylindrical member 12 not adjacent the housing 22 between edges 34 and 36 defines a filter cake drying area 42 and cake removal area 44. In the case of multiple housings 22, multiple cake drying areas 42 and cake removal areas 44 may be included. Various means may be used to remove filter cake from the exterior surface 14 of the cylindrical member 12 including, but not limited to a rotating pick-up roll 46 containing a soft rubber or soft elastomeric surface, a cloth belt containing a rough fabric such as the rough side of ripstock polyester cloth or a doctor blade. As the cylindrical member 12 rotates, a filter cake several mils thick is deposited on the exterior surface 14 in the filtration area 24, is sequentially dried in the cake drying area 42 and is removed in the cake removal area 44 so that a relatively clean filter media surface is available for filtration in the filtration area 24. Cleaning of the accumulated filter cake may also be conducted on every revolution of the cylindrical member 12. Rotation of the cylindrical member 12 enables relatively high filtration rates in a relatively compact filtration area 24.

Figure 4:
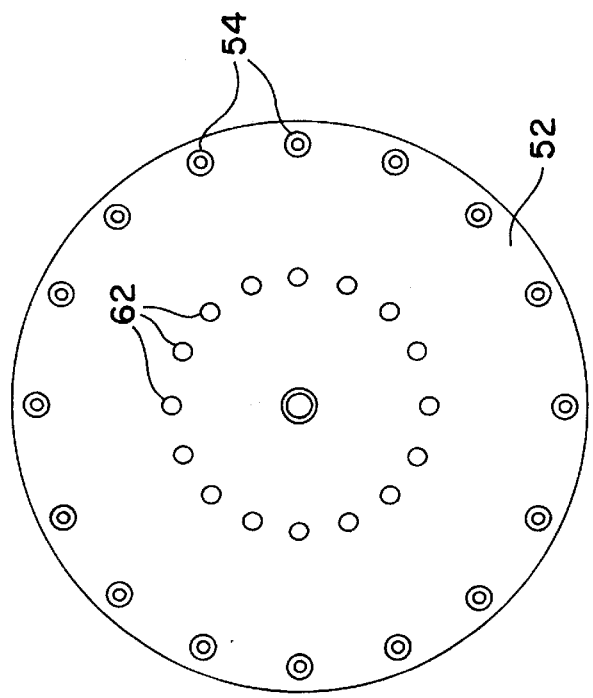
FIG. 4 is an elevational front end view of a cover plate for a cylindrical member according to the invention taken along View B—B of FIG. 3.
Figure 3:
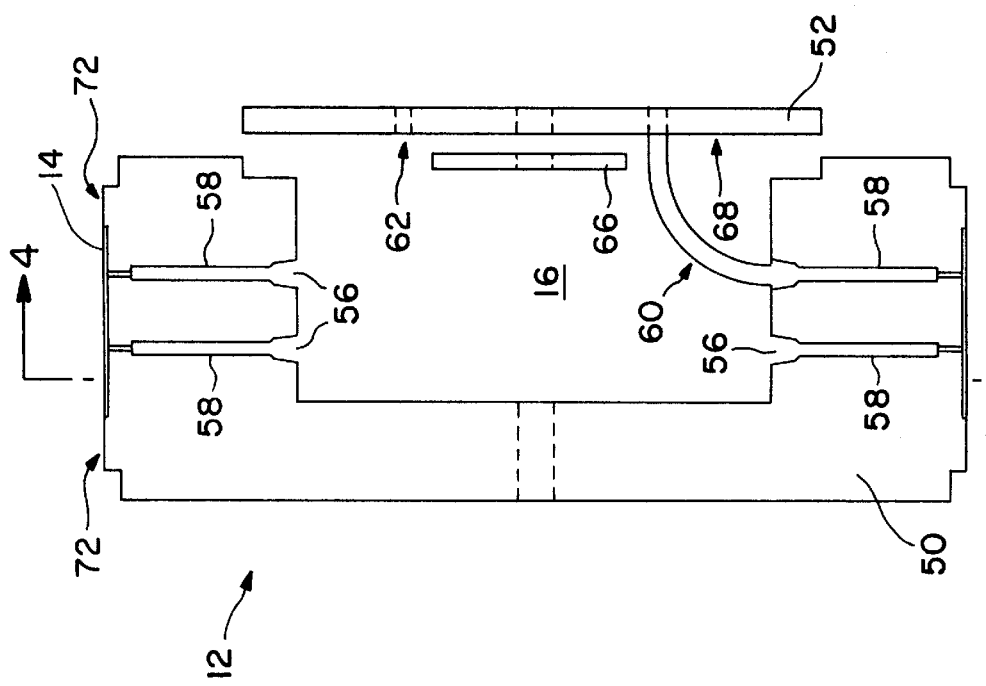
FIG. 3 is a side elevational view of a cylindrical member and cover plate according to the invention.
Figure 5:
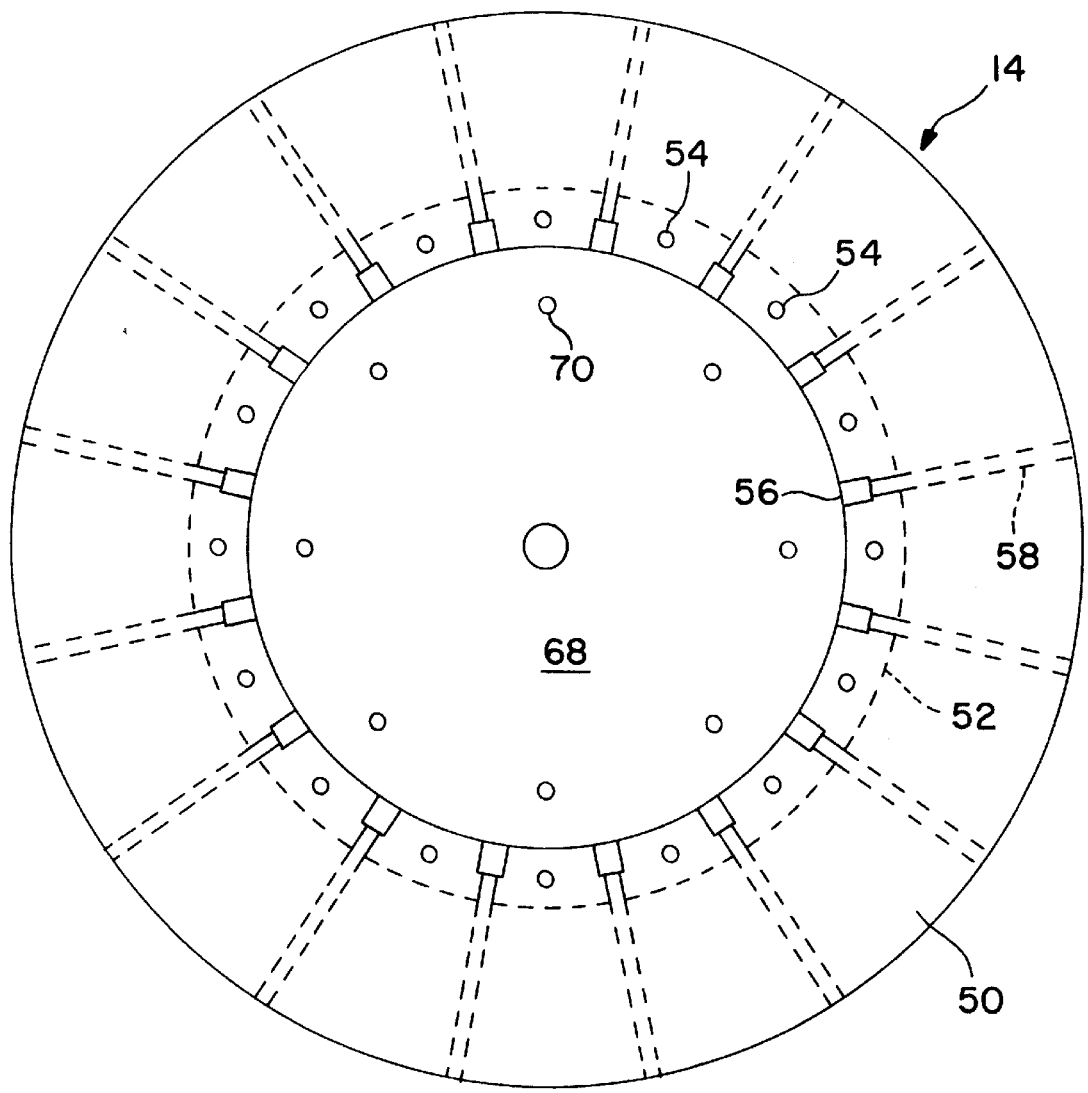
FIG. 5 is an elevational rear view of a cylindrical member according to the invention taken along View B—B of FIG. 3.

As seen in FIGS. 3, 4 and 5, the cylindrical member 12 includes an open ended cylindrical body 50 and a cover plate 52. The body 50 may be made from a wide variety of materials such as steel, engineering plastics and the like and has an overall diameter preferably ranging from about 12 inches to about 15 feet and a width preferably ranging from about 3 inches to about 40 feet. The cover plate 52 is preferably attached to the body 50 by means of bolts inserted through bolt holes 54 and has a thickness of from about 0.125 to about 0.5 inches. Like the body 50, plate 52 may be made from a wide variety of materials, especially steel, stainless steel, other metals compatible with the material being filtered and/or engineering plastics. In the alternative, the cover plate 52 may be permanently attached to the body 50 by means of adhesives, welding and the like. Whether or not the cover plate 52 is permanently attached to the body 50 is not critical to the invention. Likewise, the structure of the filter drum is not critical to the invention. Conventional filter drums may be used and conventional drum filters may be retrofit with a filter media, stationary housings and seals as described above.

The body 50 and cover plate 52 of the cylindrical member define an internal cavity 16 which is opposite an exterior surface 14 used for filtering. A plurality of fluid communication ports 56 and conduits 58 are in flow communication with the exterior surface 14 and tubes 60 (one shown) which are attached between ports 56 and apertures 62 in plate 52. Such an arrangement of tubes is described for example in U.S. Pat. No. 3,947,361 to Jackson, the disclosure of which is incorporated by reference as if fully set forth herein. A shaft 18 (FIG. 1) is attached to the drum 12 by means of a shaft plate 66 which may be bolted or otherwise fixedly attached to a portion of the inside surface 68 of plate 52. When the shaft plate 66 is attached by means of bolts, tapped and threaded holes 70 are preferably provided in surface 68 of plate 52 (FIG. 5).

During filtration, a vacuum or subatmospheric pressure may be induced in one or more of the conduits 58 by applying a vacuum to one or more of the apertures 62 in the cover plate 52 and tubes 60 attached to ports 56 of conduits 58 to promote flow of fluid from the filtration area 24 (FIG. 2) through the filter cake, filter media and exterior surface 14 of cylindrical member 12. In order to apply a subatmospheric pressure to one or more of the conduits 58, the apertures 62 in cover plate 52 are provided in fluid flow communication with a vacuum device through a vacuum plate as described in more detail below.

Referring again to FIG. 3, the body 50 also preferably contains sealing surfaces 72 for use of lateral seals to prevent flow of fluid orthogonally to the direction of rotation of the cylindrical member 12. The seals used with sealing surfaces 72 are described in more detail below and the sealing surfaces 72 are adaptable to a wide variety of conventional sealing materials including o-ring seals, felt seals, packing and the like.

Figure 6:
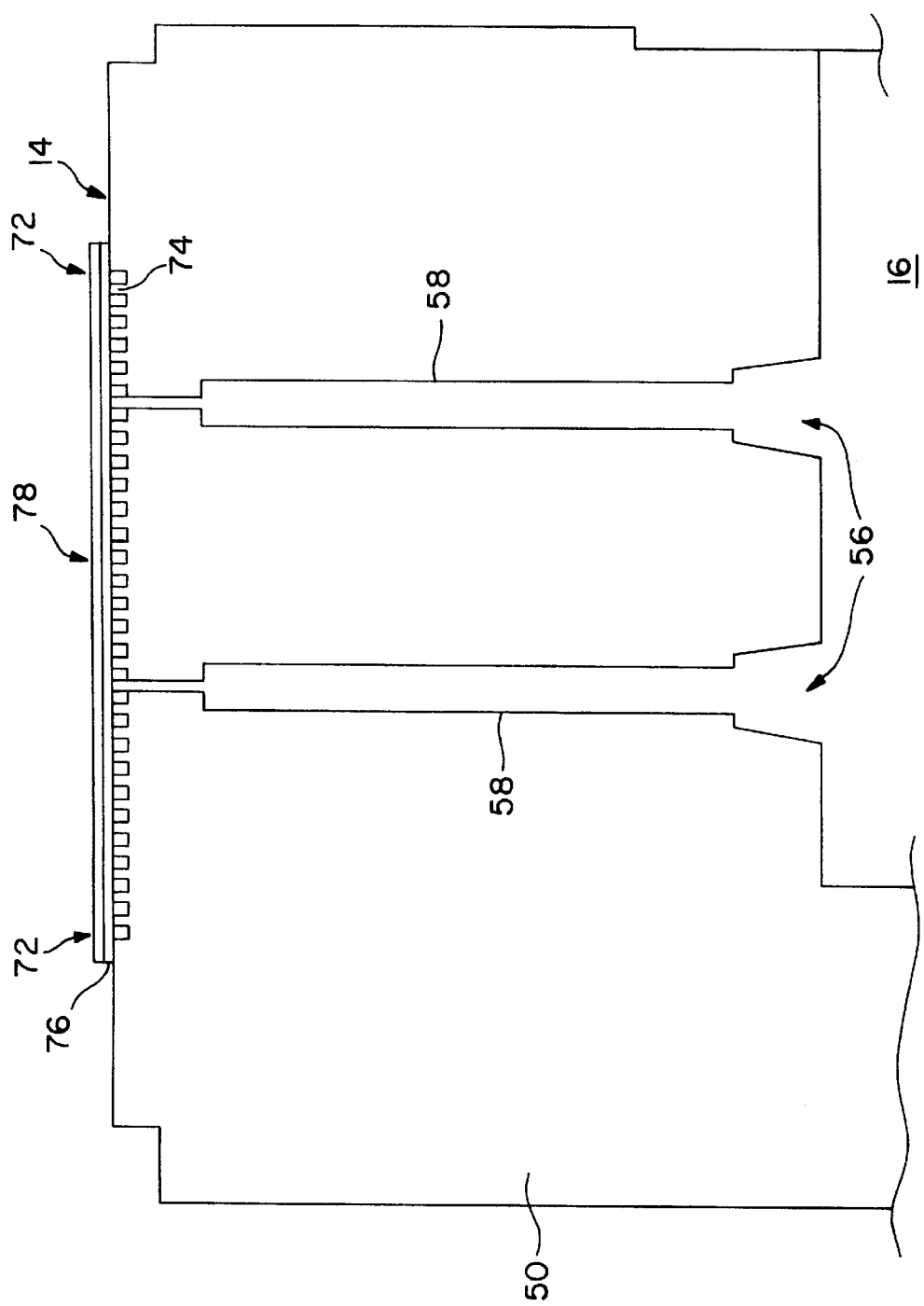
FIG. 6 is an enlarged side elevational view of a portion of a cylindrical member according to the invention.

As shown in FIG. 6, the exterior surface 14 of cylindrical member 12 preferably has an open lattice structure 74 which is preferably covered by a substantially rigid porous member 76 for supporting the a microporous filter media 78 and for enhancing the flow of liquid into conduits 58 through the filter media 78. Alternatively, the entire exterior surface 14 of the cylindrical member 12 may be made of a porous material to enhance flow of liquid through a filter media 78 into conduits 58. A preferred porous member 76 is a substantially open cell polymeric material having omnidirectional pores having an average pore size ranging from about 7 to about 250 microns. The polymeric material for porous member 76 may be selected from high density polyethylene (HDPE), ultra-high molecular weight polyethylene (UHMW), polypropylene (PP), polyvinylidene fluoride (PVDF), polytetrafluoroethylene (PTFE), polyamide, ployethersulfone (PES), ethyl vinyl acetate (EVA) and the like. A particularly preferred porous member 76 is available in sheets or rolls having a thickness ranging from about 0.025 to about 0.125 inches available from Porex Technologies of Fairburn, Ga. under the trade name POREX.

A preferred microporous filter media includes a PES, PVDF or polyamide micro filter media or ultrafiltration filter media and the like and have a thickness preferably ranging from about 40 microns to about 1 millimeter having an average pore size of less than about 50 microns in diameter, preferably from about 0.01 to about 10 microns in diameter. In the alternative, a woven cloth having substantially uniform 5 micron pores may be used as the filter media 78. Suitable membrane filter media 78 is available for example from Millipore Corporation of Bedford, Mass., Koch Industries, Inc. of Wichita, Kans., Pall Corporation of East Hills, N.Y., Fluid Systems Corporation of San Diego, Calif. and other suppliers of membrane filter media.

Figure 7:
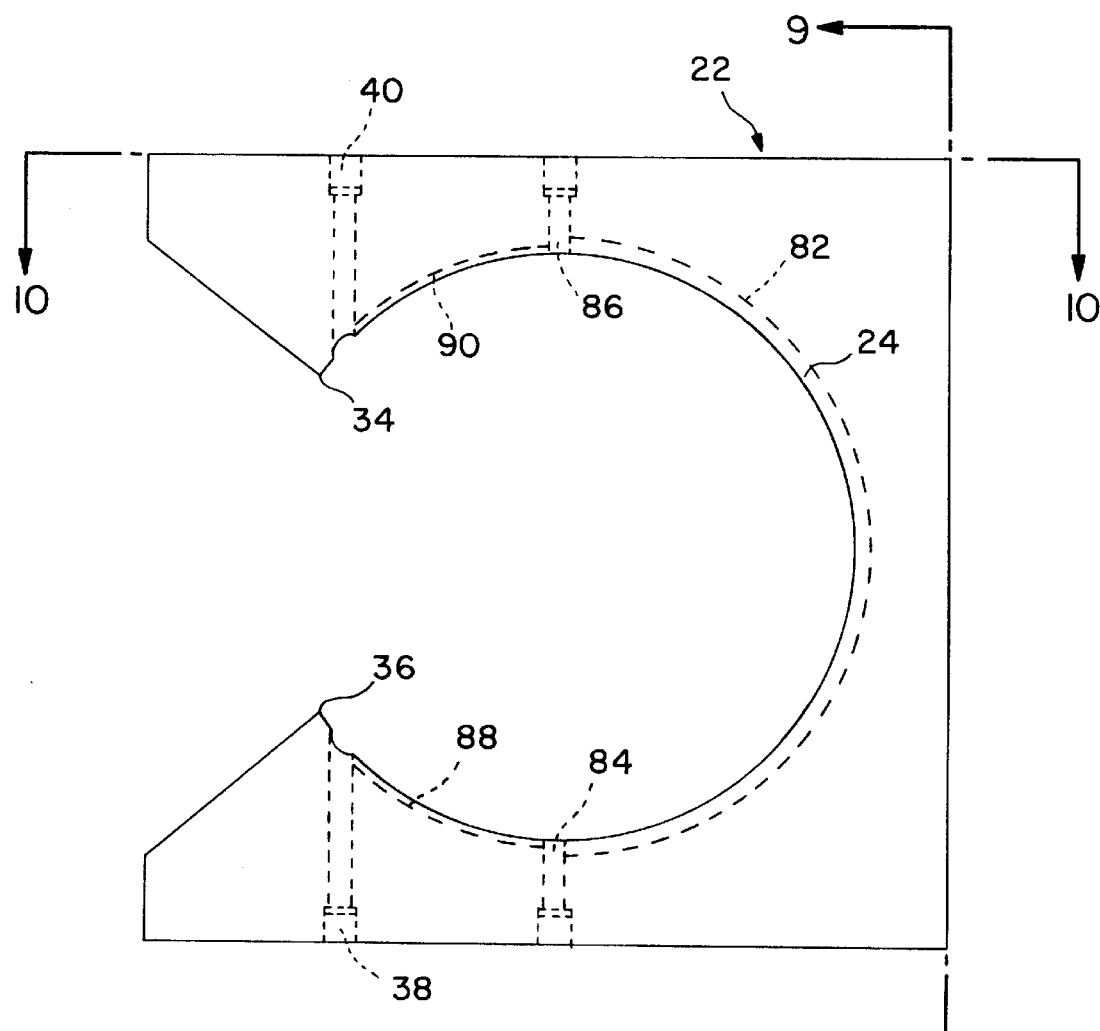
FIG. 7 is a side elevational view of a stationary housing according to the invention.

Various features of the stationary housing 22 (FIG. 22) are shown in FIGS. 7, 8, 9 and 10. Referring to FIG. 7, a side elevational view of the housing 22 is shown. The housing 22 may be made of a wide variety of materials, including but not limited to various metals and/or thermoplastic or thermoset polymeric materials and includes a filtration area 24 defined by recessed wall 82 which is generally opposite the filter cake drying area 42 and cake removal area 44 (FIG. 2). The filtration area 24 is in flow communication with a filter feed inlet port 84 and a fluid exit port 86. Inlet and exit seal areas 88 and 90 respectively are included in the housing for holding low shear seals as described in more detail below. Vacuum ports 38 and 40 are in flow communication with the seal areas 88 and 90 respectively for maintaining a subatmospheric pressure in the seal areas 88 and 90 and/or to remove any accumulated liquid from the seal areas 88 and 90 so that essentially no liquid flow past ends 34 and 36 of the housing 22.

Figure 8:
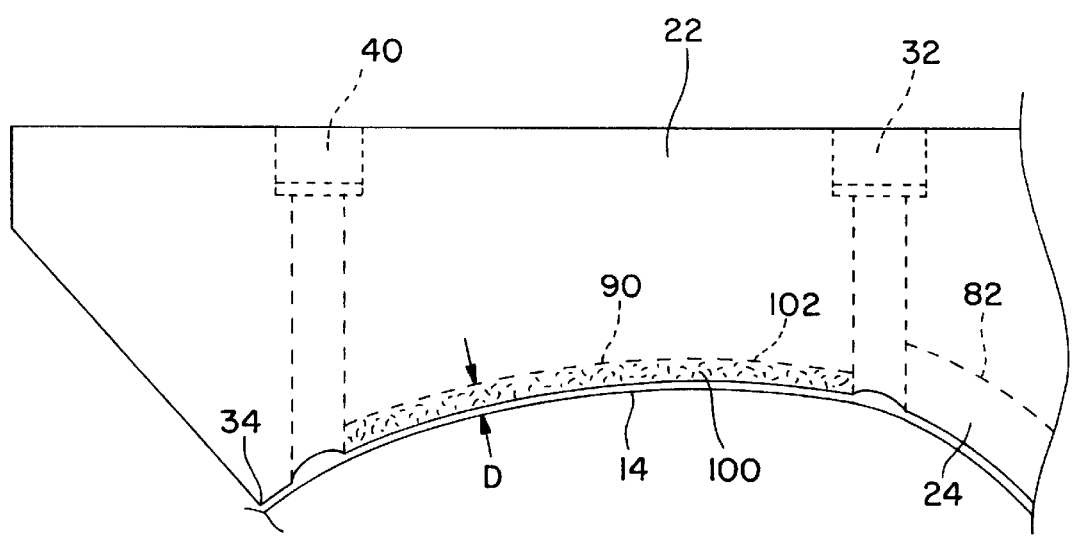
FIG. 8 is an enlarged side elevational view of a portion of a stationary housing according to the invention.

A portion of the housing 22 in the exit seal area 90 is shown in more detail in FIG. 8. According to a preferred embodiment, the exit seal area 90 includes a sealing material 100 which is preferably a dense fibrous material. The fibers of the fibrous material substantially fill a gap D between seal area wall 102 and an exterior surface 14 of cylindrical member 12 (FIG. 2). The sealing material 100 is preferably fixedly attached to the seal area wall 102 in the seal area 90 as be an adhesive or other suitable means. The inlet seal area 88 likewise contains a similar sealing material and the configuration is substantially the same as described for the exit seal area. The seal areas 88 and 90 preferably have a gap D ranging from about 2 to about 200 mils, preferably from about 5 to about 100 mils.

The fibers of the sealing material 100 preferably lightly touch the fragile surface 14 of cylindrical member 12 without compression and with minimal shear. Accordingly, the fibers are preferably very populous and flexible. Fabrics having fibers which are suitable are felts, velvet and associated fabrics. In the alternative to the use of fibrous fabrics, the fibers could be an integral part of the housing 22 formed by extreme roughness such as by filing, cutting etc. of the housing material in the seal area 90. Regardless of their source, it is preferred that the fibers provide substantially reduced fluid flow through the gap D and be sufficient to reduce the actual cross-sectional area for flow.

Figure 9:
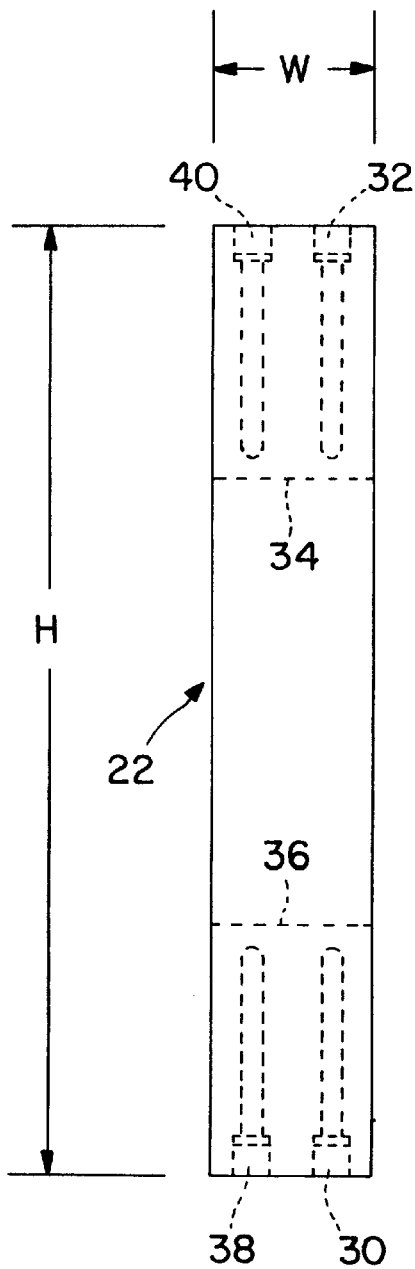
FIG. 9 is a rear side end elevational view of a stationary housing according to the invention taken along View C—C of FIG. 7.
Figure 10:
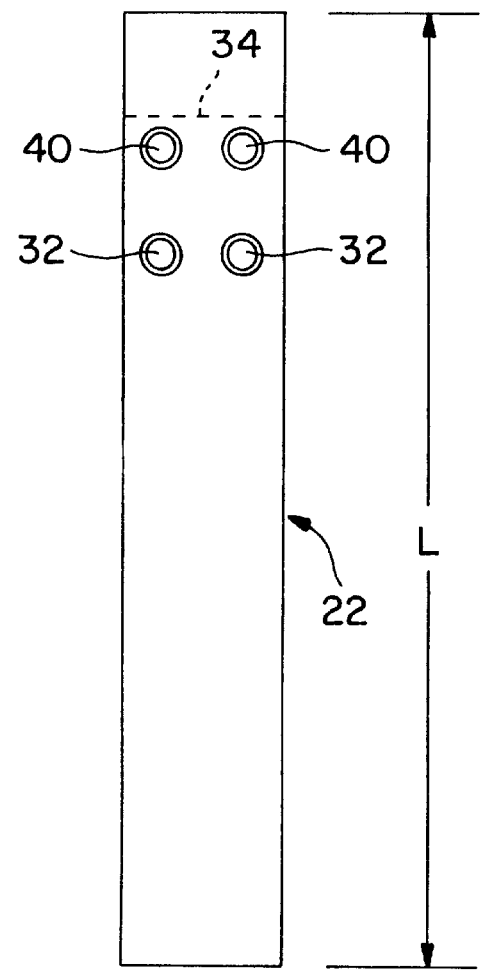
FIG. 10 is a top end plan view of a stationary housing according to the invention taken along View D—D of FIG. 7.
Figure 14:
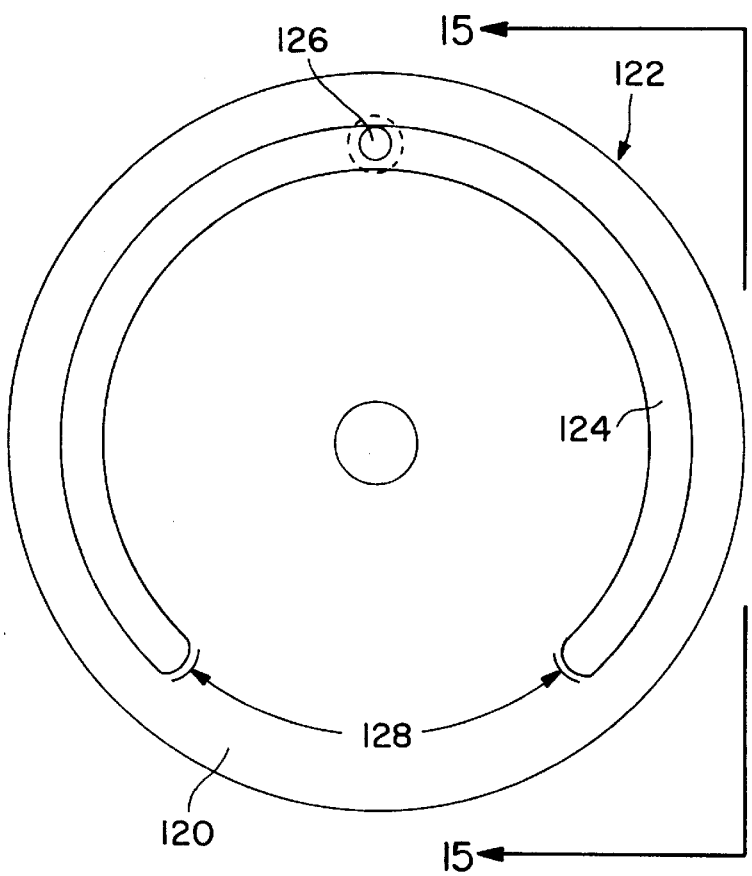
FIG. 14 is a side elevational view of a vacuum plate according to the invention.
Figure 15:
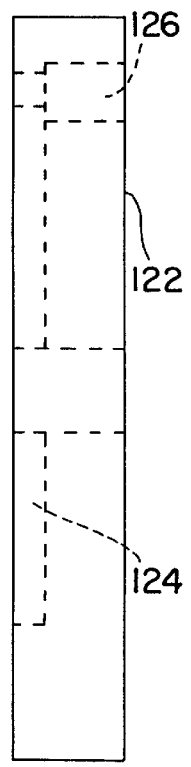
FIG. 15 is an elevational side view of a vacuum plate according to the invention taken along View F—F of FIG. 14.

Referring to FIG. 9 which is an end elevational view of the stationary housing 22 taken along view C—C of FIG. 7, and FIG. 10 which is a top plan view of the stationary housing 22 taken along view D—D of FIG. 7, it can be seen that the stationary housing for laboratory or pilot plant use may have a relatively narrow width W relative to it's overall height H and length L. Production size units may have greater lengths than widths. Accordingly, the width W may range from about 2 inches to about 36 feet, while the height may range from about 12 inches to about 13 feet and the length L may range from about 12 inches to about 13 feet.

A lateral seal plate 104 is attached to at least one end of the stationary housing 22 (FIG. 1) and preferably both ends of the housing 22 preferably by means of bolts inserted through bolt holes 106 in the seal plate 104. The seal plate 104 may also be formed integral with the housing 22 and is a relatively thin plate as shown in FIG. 12 taken along view E—E of FIG. 11 which plate is preferably made of steel, stainless steel, engineering plastics such as polycarbonate and the like. The plate 104 preferably contains a seal area 108 shown in more detail in FIG. 13. The seal area 108 is defined by grooves 110 and 112 which preferably contain o-ring seals 114 and 116 therein for sealing adjacent sealing surfaces 72 on the cylindrical member 12 (FIG. 3). Other conventional sealing material such as u-cup, inflatable, and finger seals may be used to provide a static seal relative to the rotating exterior surface 14 of the cylindrical member 12. Suitable sealing materials are materials which are compatible with the fluids being filtered and include, asbestos, cotton, VITON elastomer, TEFLON packing, GARLOCK packing and the like.

In order to provide a subatmospheric pressure in conduits 62 (FIG. 3) a vacuum plate 120 is preferably attached to the stationary housing 22 adjacent the cover plate 52 as shown in FIG. 1 and is preferably made of ultra-high molecular weight polyethylene. The vacuum plate 120 is comprised of a substantially circular plate 122 containing a groove 124 therein which is in flow communication with an aperture or vacuum port 126. During rotation of the cylindrical member 12 and cover plate 52, the groove 124 is aligned with various ones of the apertures 62 in cover plate 52 (FIG. 4) in order to induce a vacuum or subatmospheric pressure in conduits 58. The area 128 of the vacuum plate 122 which is not within groove 124 effectively seals various ones of the apertures 62 during drum rotation so that pressure may be applied to a portion of the exterior surface 14 of body 50. A wide variety of groove designs of different widths and lengths may be used.

Figure 16:
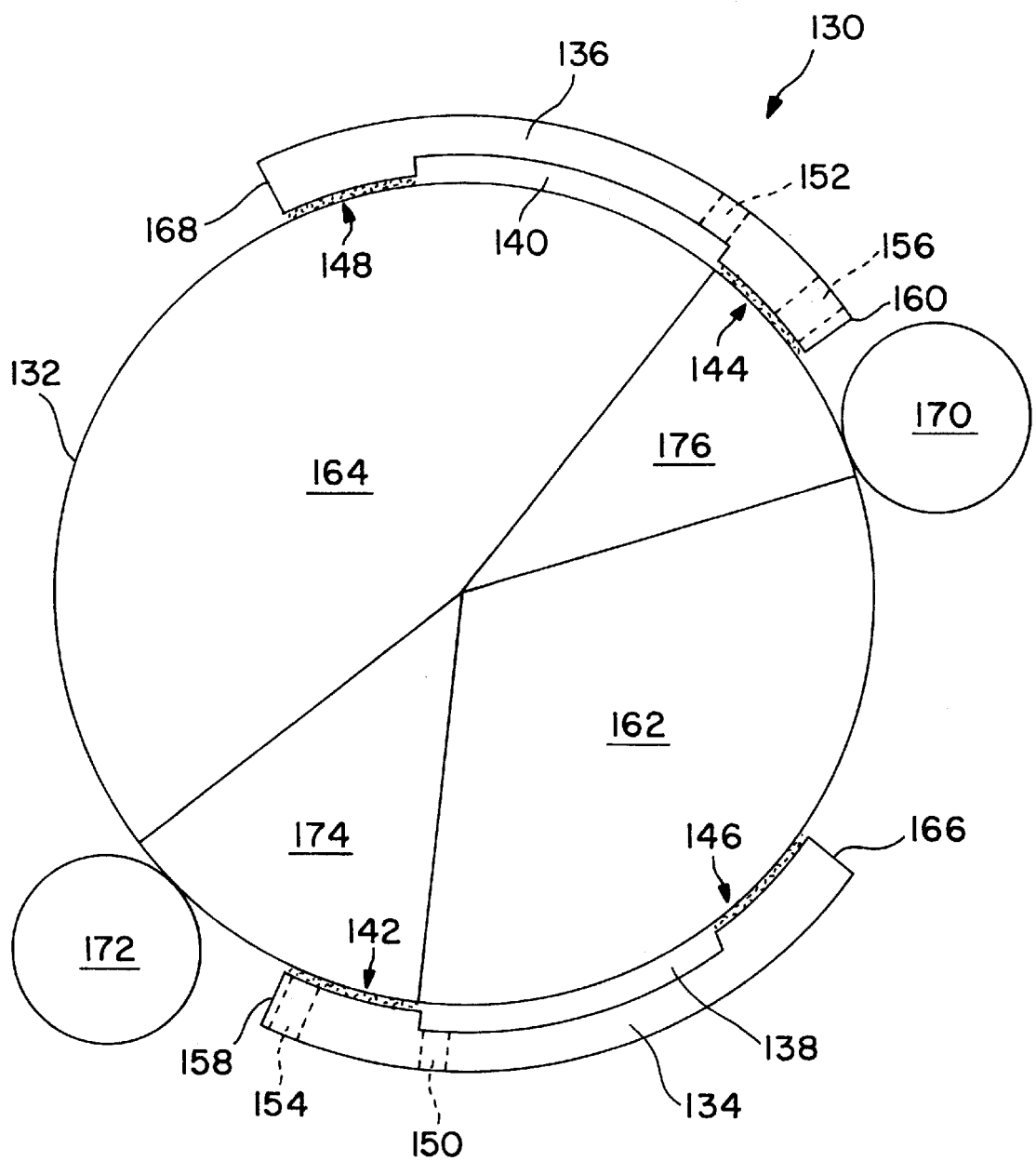
FIG. 16 is an alternate embodiment of a filter system according to the invention illustrating schematically the use of multiple filtration areas and multiple stationary housings.

In an alternative embodiment, multiple filtration areas and multiple stationary housings may be used with a rotating cylindrical member to obtain enhanced filtration of various materials as shown schematically in FIG. 16. As shown in FIG. 16, the filter system 130 contains a cylindrical member 132 which rotates relative to stationary housings 134 and 136. Each of the stationary housings 134 and 136 contains puddle coating regions 138 and 140 disposed between entrance seals 142 and 144 and exit seals or wipers 146 and 148. The material to be filtered is fed via feed ports 150 and 152 into the puddle coating or filtration regions 138 and 140. Suction ports 154 and 156 are preferably provided adjacent ends 158 and 160 of housings 134 and 136. The suction ports 154 and 156 are in flow communication with seals 142 and 144 in order to remove excess liquid from the entrance seals 142 and 144 and to reduce or eliminate any loss of liquid from the puddle coating regions 138 and 140. As described above with reference to FIGS. 7 and 8, the housings 134 and 136 may also include vacuum ports such as 92 and 94 (FIG. 7) to promote removal of any excess liquid from the wipers 146 and 148.

During filtration, vacuum may be applied to various regions of the cylindrical member 132 as indicated by areas 162 and 164. These areas are adjacent the puddle coating regions 138 and 140 and the wiper regions 146 and 148 of the stationary housings 134 and 136. There is also an area between the ends 166 and 168 of the housings and cake removal drums 170 and 172 which is also under vacuum or subatmospheric pressure during filter operation. The subatmospheric pressure between ends 166 and 168 and drums 170 and 172 promotes flow of ambient air through the filter cake on the exterior surface of cylindrical member 132 for drying the cake to a solids content ranging from about 38 to about 90 percent by weight excluding bound water before removing the cake from the cylindrical member 132 with drums 170 and 172.

Removal of filter cake with drums 170 and 172 is promoted by preferably operating regions 174 and 176 under atmospheric pressure conditions or under slight superatmospheric pressure conditions. Accordingly, no vacuum is applied to regions 174 and 176 during filtration.

In order to reduce or eliminate damage to the fragile membrane attached to cylindrical member 132, it is preferred that drums 170 and 172 have substantially the same linear speed as cylindrical member 132. This may be achieved as by the use of intermeshing gears attached to the shafts of the drums and cylindrical members. The drums are spaced from the cylindrical member a distance sufficient to contact the filter cake without significant compression thereof. Accordingly, the spacing between drums 170 and 172 and cylindrical member 132 may range from about 0 to about 0.050 inches. The drums may also have a resilient or elastomeric surface which may be slightly compressed upon contact with the filter cake.

While not attempting to limit the invention in any way, the drum filter as described above may be loosely described as a rotary vacuum drum filter having a cross flow membrane device. The filter includes a rotating porous cylindrical member which is under pressure in a chamber or plurality of chambers. The bottom wall of the chamber is a membrane or filter media on the outer surface of the porous cylindrical member, the top wall of the chamber is a shell and the lateral sides are seals which contact both the cylindrical member and the top, and the transverse seals are designed to produce minimum shear with the fragile media on the surface of the cylindrical member.

The shell is used to contain the flow of liquid to the cylindrical member. It may have elements to increase the amount of turbulence thereby increasing the dewatering rate of the material being filtered. The top of the shell could also be porous and have a membrane mounted to it for additional dewatering capacity. Such a membrane would be stationary and not exit the chamber upon rotation of the cylindrical member.

During a conventional filtration cycle, the cylindrical member is rotated at a linear surface speed relative to the stationary housing ranging from about 1 foot per minute to about 200 feet per minute. A motor directly coupled to the shaft attached to the cylindrical member or indirectly coupled to the shaft by means of a pulley and belt or chain and sprockets may be used to rotate the cylindrical member. A slurry is fed to the chamber between the shell and the cylindrical member through a feed inlet thereby coming into contact with the surface of the cylindrical member which contains filter media. The slurry is confined in the chamber by an entrance transverse seal. A vacuum is generally but not necessarily applied to one or more portions of the rotating cylindrical member. Flow of slurry over the rotating cylindrical member surface provides a cross flow to minimize the formation of a cake. Excess slurry is removed from the chamber through the feed outlet and the slurry may be recirculated back to the chamber. The slurry is maintained in the chamber by the transverse exit seal.

A portion of the liquid from the slurry passes through the filter media on the surface of the cylindrical member under the influence of the either or both of pressure above and vacuum below the filter media producing a filtrate which is substantially free of solids. A cake is formed as part of the dewatering, and the cake which is adhered to the filter media exits the chamber under the transverse seals. A subatmospheric pressure applied in a drying section of the filter further removes water from the cake. The cake, now reduced to a paste like consistency may be removed from the media surface by any of a variety of no or low shear devices, such as a pickup roll driven at the same linear velocity as the filter media as described above or an air knife. The membrane may also be cleaned after removal of the filter cake by any of a variety of cleaning methods and once cleaned the filter media again enters the chamber for reuse. Drum filters, as described above, may be operated on a batch, semi-continuous or continuous basis.

Typical operating conditions include a drum speed of from about 0.1 to about 60 RPM, a slurry velocity of from about 0 to about 15 ft/sec and feed slurry solids of from about 2 to about 75 wt. %. The slurry carrier fluid, slurry temperature and pH will depend on the materials being filtered and the materials of construction of the filter. The pressure applied to the membrane in the chamber may range from about 0 psig up to about 25 psig, and the vacuum applied to the cake may range from about 0" of Hg down to about 29" Hg.

Advantages of the drum filter according to the invention over a belt filter in which filter media is mounted on a belt and the belt is continuously pulled through a chamber under cross flow conditions as described in U.S. Pat. No. 5,259,952 to Lee include a cylindrical filter surface rather than flat filter surface, a solid drum which replaces a flexible belt and a filter containing a single chamber for both cake formation and dewatering.

The chamber length for filtrating available in a belt filter type filter is limited because of the limited strength of the belt whereas a significantly larger chamber may be used with the above described drum filter because of the significant strength of the solid filter drum. Furthermore, the seal arrangement for a belt filter is much more complicated and requires a sealing surface below the membrane as well as close balancing of friction components therein in order to avoid wrinkling the belt which may damage the membrane. As described above, the major frictional component is in the area of the side or lateral seals which contact only the edge portions of the drum and are not in frictional contact with the membrane.

The cylindrical shape allows a significant increase in the percentage of membrane in use at any particular time. The only limitation to the amount of membrane which may be used is the space required for cake drying, cake removal, and cleaning. In most cases these steps can be accomplished by use of less than 25% of the membrane surface area, as determined by the drying time and the drum speed. A belt-type filter requires at least about 50% of the belt surface area for the return of the belt from under the machine between the exit of the chamber and the chamber entrance. There is no need for belt tensioning and alignment in a drum type filter according to the invention.

The apparatus of the invention may be used in a wide variety of applications. It greatest potential, however, is in the separation of very fine particulate material whose particle size is less than about 10 microns from liquids and colloidal suspensions or slurries containing the material.

With conventional filtration equipment, it is often advantageous to flocculate the solids in the slurry in order to effectively increase the particle size. A step is then required to remove the flocculent or to deflocculate the filtered agglomerates to obtain particles having the original particle size. Such process steps are conducted for example in the kaolin clay industry. In a conventional filtration, process a 30 wt. % clay slurry is acidified and flocculated. The flocculated slurry is then be filtered on rotary vacuum filters to 60 wt. % solids. Caustic is added to the cake, which reliquifies the cake, which is then dried in a spray dryer.

Use of the drum filter according to the invention eliminates the need to use flocculants thus eliminating the foregoing steps. The solids content of the cake is increased to from about 60 to about 80% solids using a drum filter according to the invention and the filter cake may then be fed as a paste into a conventional dryer or substantially dried on the filter drum. Advantages of the use of the drum filter according to the invention over conventional technology is that higher solids may be obtained reducing drying operating costs, a lower cost, conventional solids dryer may be used to dry the filter cake, processing steps for flocculation and removing flocculants may be eliminated reducing equipment and operating costs, chemical use is reduced thereby reducing wastewater loading and the drum filter significantly reduces the risk of permanently changing the particle size distribution of the particles being filtered.

The drum filter according to the invention may also be used for various other applications including, but not limited to drinking and wastewater treatment, organic and inorganic pigment production, production of ferro magnetic particles for audio and video tapes, production of fine particles for catalysts, recovery of silver halide particles in camera film production, and production of fine glass spheres for fiber optics.

For applications where it is desirable to recover the liquid portion of a slurry or solids suspension, the drum filter according to the invention has other advantages. Examples of this kind of operation abound in the food and beverage industry such as clarification of dextrose, maltose and maltodextrose in corn sugar manufacturing, clarification of fruit juices such as apple, pear, grape, mango, pineapple, recovery of the lees in wine manufacture. Conventional filters for these applications often require precoat of the filter media with a filter aid. Once a suitable precoat layer is built on the filter media, the precoat acts as the filter media. Typical filter aids are diatomaceous earth, fuller's earth, and powdered activated charcoal. The precoat layer may be several inches thick to get the desired effective pore size. After a period of filtration, the precoat layer becomes filled with the fines from the slurry, the filtration cycle is stopped, the precoat layer is removed and the process of precoating the filter is repeated.

An advantage of the present invention over conventional precoat type filters is that no precoat material is required for most applications thus eliminating material costs and disposal cost. There is an increase in on-line time because the need to precoat the filter media and remove the precoat material is eliminated. Typically better filtrate quality can be obtained than with a conventional precoated filter. The solids product is not contaminated with precoat materials potentially enabling it to be sold as a by-product. Off spec product produced when the precoat cake cracks, falls off or has other operational problems is virtually eliminated.

The drum filter according to the invention may also be a suitable replacement for centrifuges which are generally operated to perform the solids liquid separation either by maximizing the solids content and sacrificing filtrate quality or by maximizing filtrate quality and sacrificing solids concentration. The drum filter according to the invention is adaptable to provide both the high solids concentration and a highly clear or solids free permeate in a single step.

In certain applications it may be beneficial to utilize the drum filter according to the invention to separate particles from one another based on diameter and/or size. Examples would be the removal of fine clays from a coal slurry in coal washing and the removal of fibers or large particulate from paper coating. In order to accomplish these goals, the cross flow velocity in the drum filter may be increased, the chamber length reduced or rotational speed of the drum filter increased and a minimum transmembrane pressure (pressure above and vacuum below the filter media) may be applied to the filter media. These actions taken together or individually can enable the smaller particles to pass through the medium, while the larger particles are retained and redispersed within the chamber.

In some applications, the solids content of the slurry is sufficiently high that cross flow of the slurry is not required to obtain sufficient dewatering. In these cases, the drum filter may be operated more like a "puddle coater" having one or more relatively short filter chambers. The slurry is fed into the chamber where water is removed directly forming the cake. The cake exits the chamber and is dried and removed as described above. An example of such an operation is the filtration of 30 wt. % solids kaolin clay and 10 wt. % precipitated calcium carbonate.

The drum filter also provides for the addition of fresh water to the exit end of the chamber for cake washing. The wash water is filtered through the cake thereby washing dissolved impurities from the cake. Examples of this application include production of magnetic particles for audio and video tape in which the cake must have a very low conductivity when reslurried, and the washing of the sugar containing syrup from the cake in high fructose sugar manufacturing.

The drum filter design described above is also adaptable to enhancing turbulence in the filter chamber by drum rotation alone thereby eliminating the need for crossflow. In this case the shear induced by a relatively fast moving drum (about 160 ft/min. or more) in combination with either a very thin gap between the membrane and the chamber walls, or turbulence promotion devices mounted on the chamber walls can cause sufficient turbulence to keep cake growth to an acceptable minimum.

Although the filtration system described above sets forth the preferred embodiment wherein the cylindrical member is rotated relative to a stationary housing, the unique features of the invention are also adaptable to a filtration system wherein the housing revolves around a stationary cylindrical member or wherein both the housing and cylindrical members may rotate about a common axis either in the same direction or in opposite directions.

While the invention has been described in detail, it is to be expressly understood that various changes of form, design or arrangement may be made to the invention by those skilled in the relevant art without departing from the spirit and scope of the invention. Therefore, the above mentioned description is to be considered exemplary, rather than limiting, and the scope of the invention is defined by the following claims.

What is claimed is:

1. A filter assembly for treating a mixture of solids and liquid to yield a paste-like filter cake and a substantially solids free filtrate or permeate, the filter assembly comprising a substantially cylindrical member having an exterior foraminous surface, the cylindrical member being mounted on an elongate shaft for rotating the exterior foraminous surface about an axis defined by the shaft, the exterior foraminous surface being covered by a microporous filter media, a stationary housing adjacent a portion of the exterior surface of the cylindrical member, the stationary housing including a filter feed inlet and a sealing system, the sealing system and housing being arranged and spaced from the exterior surface of the cylindrical member a distance sufficient to enable cross flow relative to the filter media, a filter seal member operatively associated with the housing for promoting retention of fluid to be filtered in the housing adjacent the filter media, a drive for rotating the cylindrical member about the axis and a cake removal or membrane cleaning device external to the housing and adjacent the exterior surface of the cylindrical member.

2. The filter assembly of claim 1 wherein the seal member comprises an entrance seal member and an exit seal member.

3. The filter assembly of claim 1 wherein the cylindrical member defines an internal cavity opposite the exterior surface thereof.

4. The filter assembly of claim 3 wherein the filter assembly further comprises a vacuum device in flow communication with the internal cavity for inducing a differential pressure through at least a portion of the filter media.

5. The filter assembly of claim 3 wherein the internal cavity comprises a pressure cavity and a vacuum cavity.

6. The filter assembly of claim 5 wherein the assembly further comprises a vacuum device in flow communication with the vacuum cavity and a pressure device in flow communication with the pressure cavity, the vacuum and pressure devices sufficient to induce differential pressures through at least a portion of the filter media.

7. The filter assembly of claim 1 wherein the housing is spaced a distance of from about 60 to about 500 mils from the exterior surface and filter media.

8. The filter assembly of claim 1 wherein the sealing system comprises a fibrous web.

9. The filter assembly of claim 1 wherein the housing is spaced from the filter media adjacent the sealing system a distance of from about 5 to about 100 mils.

10. The filter assembly of claim 1 wherein the exterior surface comprises a filtering section and a cake drying section.

11. A method for producing a paste-like filter cake from a mixture of liquid and solids which comprises providing a filter system including a substantially cylindrical member having an exterior foraminous surface, the cylindrical member being mounted on an elongate shaft for rotating the exterior foraminous surface about an axis defined by the shaft, the exterior foraminous surface being covered by a microporous filter media, a stationary housing adjacent a portion of the exterior surface of the cylindrical member, the stationary housing including a filter feed inlet and a sealing system, the sealing system and housing being arranged and spaced from the exterior surface of the cylindrical member a distance sufficient to enable a flow selected from the group consisting of cross flow and flooding flow in the space between the housing and cylindrical member, the sealing system comprising a filter seal member operatively associated with the housing and cylindrical member defining a filtration area between the housing and cylindrical member for promoting retention of fluid to be filtered in the filtration area, a drive for rotating the cylindrical member about the axis and a cake removal or membrane cleaning device external to the housing and adjacent the exterior surface of the cylindrical member, feeding a liquid containing solids through the filter feed inlet at a pressure and a rate sufficient to form a filter cake having a solids content including bound water above about 65 wt. % on the filter media while rotating the cylindrical member relative to the housing, maintaining a relatively even filter cake height during filtering, drying the filter cake, and removing the filter cake from the filter media external to the housing.

12. The method of claim 11 wherein the cylindrical member defines an internal cavity opposite the exterior surface and collecting a filtrate or permeate in the internal cavity during operation of the filter system.

13. The method of claim 11 wherein the filter system includes a vacuum device in flow communication with the internal cavity for inducing a differential pressure through at least a portion of the filter media further comprising drying the filter cake by applying a differential pressure to the filter cake.

14. The method of claim 13 wherein the differential pressure for drying the filter cake is applied to the filter cake external to the housing.

15. The method of claim 11 wherein the filter cake height is maintained relatively thin by rotating the cylindrical member containing the filter media and filter cake relative to the housing and filter seal member.

16. The method of claim 15 wherein the filter seal member comprises a fibrous web.

17. The method of claim 16 wherein the housing is spaced from the filter media adjacent the seal member a distance of from about 5 to about 100 mils.

18. The method of claim 17 wherein the fibrous web is selected from felt and velvet fibrous materials.

19. The method of claim 11 wherein the filter system is operated on a continuous filtration cycle.

20. The method of claim 11 wherein the liquid containing solids is fed through the filter feed inlet at a rate sufficient to provide a cross flow rate adjacent the filter media of up to about 15 feet per second.

21. A filter assembly for treating a mixture of fluid and solids to yield a paste-like filter cake and a substantially solids free filtrate or permeate, the filter assembly comprising a substantially cylindrical member having an exterior porous surface and an internal cavity opposite the exterior surface thereof, the exterior surface comprising one or more filtering sections and one or more cake drying sections, the cylindrical member being mounted on an elongate shaft for rotating the exterior porous surface about an axis defined by the shaft, the exterior porous surface being covered by a microporous filter media, two or more stationary housings adjacent spaced-apart portions of the exterior surface of the cylindrical member, the housings and cylindrical member defining filtration areas, each of the stationary housings including a sealing system and being spaced from the exterior surface a distance of from about 60 to about 500 mils, the sealing systems including inlet and exit filter seal members operatively associated with the housings and cylindrical member for retaining fluid to be filtered within the filtration area adjacent the filter media, a drive for rotating the cylindrical member about the axis, a cake removal or membrane cleaning device external to the housings and adjacent the exterior surface of the cylindrical member and a vacuum device in flow communication with the internal cavity for inducing a differential pressure through at least a portion of the filter media.

22. The filter assembly of claim 21 wherein the internal cavity comprises a pressure cavity and a vacuum cavity.

23. The filter assembly of claim 22 wherein the vacuum device is in flow communication with the vacuum cavity the filter assembly further comprising a pressure device in flow communication with the pressure cavity, the vacuum and pressure devices being sufficient to induce differential pressures through at least a portion of the filter media.

24. The filter assembly of claim 21 wherein the seal members comprise fibrous webs.

25. The filter assembly of claim 21 wherein each of the housings is spaced from the filter media adjacent the seal members a distance of from about 5 to about 100 mils.

26. A filter assembly for treating a mixture of fluid and solids to yield a paste-like filter cake and a substantially solids free filtrate or permeate, the filter assembly comprising a substantially cylindrical member having an exterior porous surface and an internal cavity opposite the exterior surface thereof, the exterior surface comprising one or more filtering sections and one or more cake drying sections, the exterior porous surface being covered by a microporous filter media, one or more housings adjacent spaced-apart portions of the exterior surface of the cylindrical member, the housings and cylindrical member defining filtration areas, each of the housings including a sealing system and being spaced from the exterior surface a distance of from about 60 to about 500 mils, the sealing systems including inlet and exit filter seal members operatively associated with the housings and cylindrical member for retaining within the filtration area adjacent the filter media fluid to be filtered, a cake removal or membrane cleaning device external to the housings and adjacent the exterior surface of the cylindrical member, a vacuum device in flow communication with the internal cavity for inducing a differential pressure through at least a portion of the filter media and a drive for rotating the cylindrical member relative to the housings, for rotating the housings relative to the exterior surface of the cylindrical member or for rotating both the cylindrical member and the housings relative to one another in the same or opposite directions.

27. The filter assembly of claim 26 wherein the cylindrical member is stationary and the one or more housings rotate relative to the exterior surface of the cylindrical member.

28. The filter assembly of claim 26 wherein cylindrical member and one or more stationary housings rotate relative to one another in opposite directions.

* * * * *